Nov. 4, 1924.

A. COVIELLO 1,514,134

AUTOMOBILE TRAFFIC SIGNAL

Filed May 23, 1924    2 Sheets-Sheet 1

Inventor
Anthony Coviello.
By A. J. O'Brien
Attorney

Nov. 4, 1924.
A. COVIELLO
1,514,134
AUTOMOBILE TRAFFIC SIGNAL
Filed May 23, 1924      2 Sheets-Sheet 2
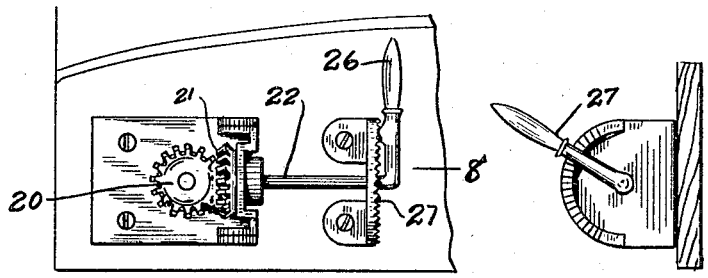
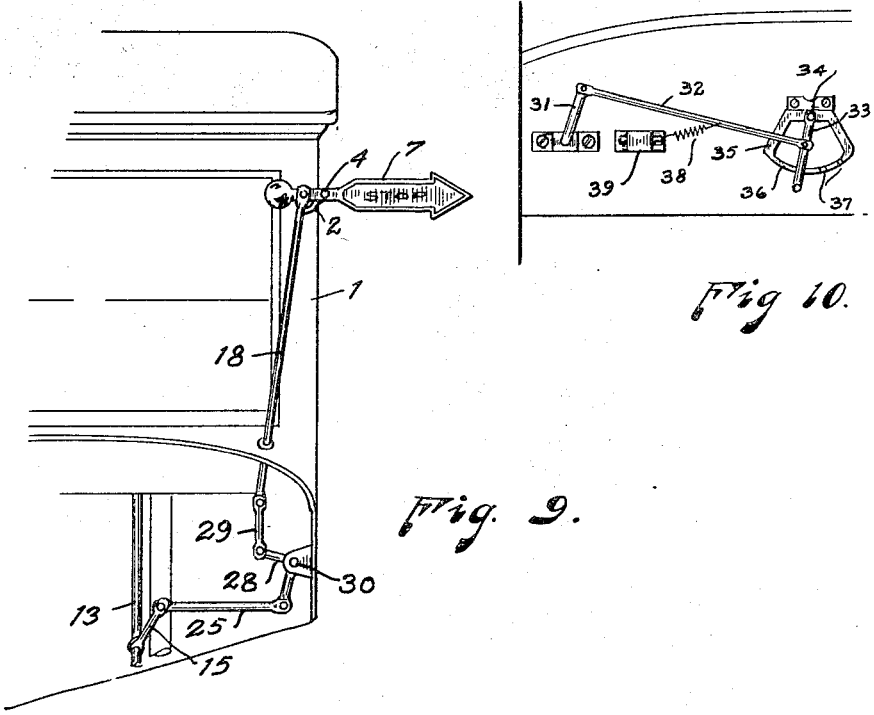
Inventor
Anthony Coviello.
By Patented Nov. 4, 1924.

1,514,134

UNITED STATES PATENT OFFICE.

ANTHONY COVIELLO, OF DENVER, COLORADO.

AUTOMOBILE TRAFFIC SIGNAL.

Application filed May 23, 1924. Serial No. 715,331.

*To all whom it may concern:*

Be it known that I, ANTHONY COVIELLO, a citizen of the United States, residing at the city and county of Denver and State of Colorado, have invented certain new and useful Improvements in Automobile Traffic Signals; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in traffic signals for automobiles.

The need of an efficient automobile signal has long been recognized and the need is constantly growing greater, due to the increased number of automobiles and to the increased use of closed cars.

It is the practice today for automobilists to indicate their intention to stop or to turn by extending the left arm. This works fairly well when ordinary open or touring cars are employed, although it becomes very difficult when the car is equipped with side curtains. When closed cars are used, the use of the arm for signalling is practically impossible.

It is the object of this invention to produce a simple and efficient signal suitable for use on all types of automobiles, but intended more especially for use in connection with closed cars.

It has been pointed out above that it is customary at present for the driver to signal with his left arm and for this reason the attention of the driver of a following car is directed to the point where the arm would appear were he to signal. A signal on the rear of the car or in some unusual place would therefore be very likely to be overlooked. I have therefore so designed my signal that it will appear substantially in the place where the driver's hand would appear, namely, on the left side of the car near the front.

My signal, briefly described, consists of a semaphore member made in the form of a box having glass sides and provided on its inside with an incandescent lamp which becomes lighted when the signal is operated. This semaphore member is pivoted to a supporting bracket secured to the front frame corner post on the lefthand side of the automobile and is adapted to swing in a vertical plane from an inoperative or vertical position to an operative or horizontal position. For the purpose of operating the semaphore member, I have provided a system of links and levers which transmit motion from a point near the steering wheel to the signal or semaphore member.

In order better and more clearly to describe my invention, I shall have reference to the accompanying drawing in which the preferred embodiment thereof is illustrated, and in which:

Fig. 7 is a view showing a slightly modified form;

Fig. 8 is a side elevation of the parts shown in Fig. 7;

Fig. 9 is a view similar to Fig. 1 showing a modification; and

Fig. 10 is a view showing a slightly modified form.

Figure 3:
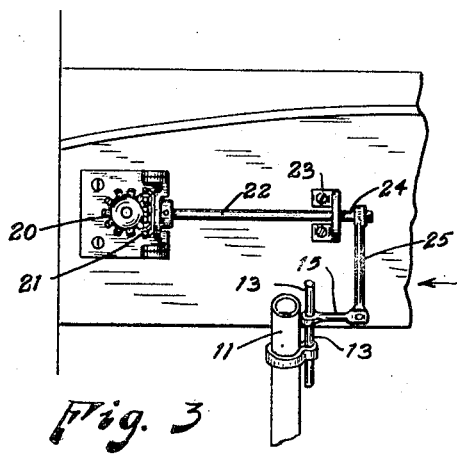
Fig. 3 is a view looking in the direction of the arrows 3—3, Fig. 4.
Figure 4:
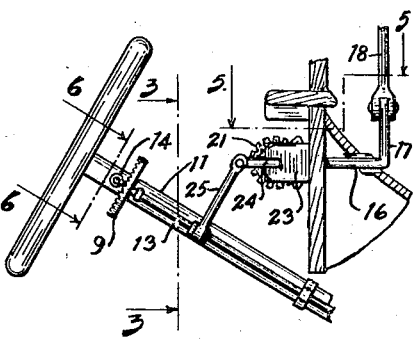
Fig. 4 is a view looking in the direction of the arrow 4 in Fig. 3.
Figure 6:
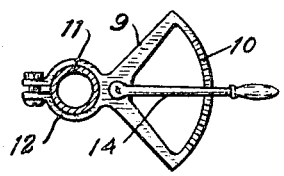
Fig. 6 is a section taken on line 6—6, Fig. 4, and shows the control lever.
Figure 5:
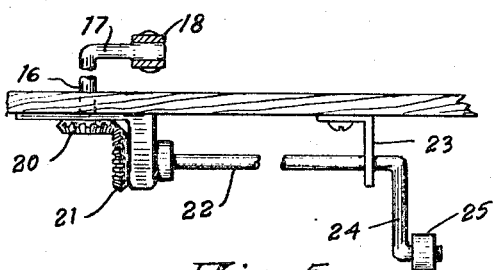
Fig. 5 is a section taken on line 5—5, Fig. 4.
Figure 1:
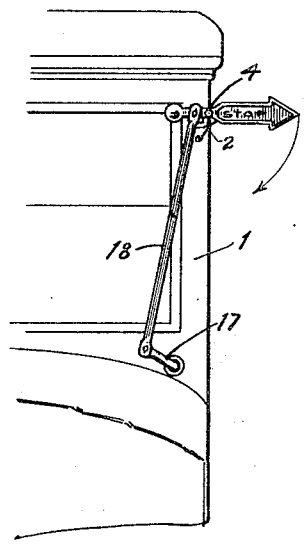
Fig. 1 is a front elevation of a portion of an automobile showing my improved signal attached thereto and in operative position.
Figure 2:
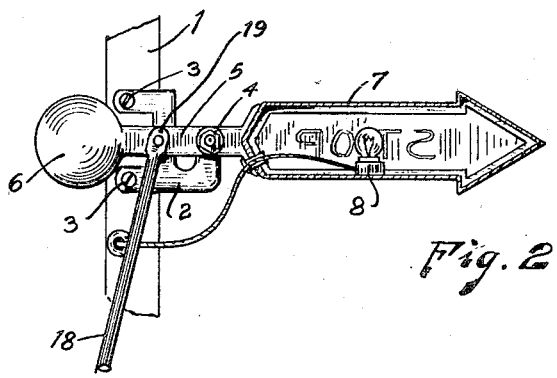
Fig. 2 is a front elevation of the semaphore member, a portion thereof being broken away to better disclose the construction.

Numeral 1 represents the front vertical frame post on the lefthand side of the car. To this post I secure a bracket 2 by means of screws 3. This bracket has a horizontal pivot 4 to which the semaphore member is pivoted. This member has an arm 5 provided at one end with a counter-weight 6 and at the other end with a box 7 made somewhat in the shape of an arrow. The front and rear sides of this box are made of glass with the word "Stop" painted thereon with opaque paint. A lamp 8 is located within the member 7 and serves to make it luminous and visible after dark. When the semaphore is in operative position, it projects outwardly in the manner shown in Figs. 1 and 2, but when it is inoperative it is moved to a vertical position. For the purpose of moving the signal from inoperative to operative position and back again, I have devised the following mechanism:

A quadrant 9, having a notched arcuate member 10, is secured to the steering post 11 by means of a clamp 12. A rod 13 has its upper end pivoted to the quadrant 9 and provided with a handle 14 which can be moved over the teeth of the arc 10. A crank 15 is connected to the rod 13 a short distance below the quadrant. Pivoted in the cowl is a rod 16 whose outer end is bent at right angles to form a crank 17. A connecting rod 18 extends from the end of the crank 17 to a point 19 on member 5, which point lies between the pivot 4 and the counter-weight 6. It is now evident that by rotating the rod 16 the semaphore can be moved about its pivot 4. To the inner end of the rod 16 I secure a gear wheel 20 which meshes with another gear 21 secured to the end of the shaft 22. The other end of shaft 22 is rotatably supported by the bracket 23 and has the extreme end thereof bent at right angles to form a crank 24, to which one end of a link 25 is pivotally connected. It is now apparent that the driver, by grasping the lever 14 and by means of it rotating the shaft 13, can move the semaphore signal member to any position desired.

In Figs. 7 and 8, I have shown how an operating handle 26 may be fastened to the shaft 22 and cooperate with a quadrant 27. The signal can then be controlled by moving the handle 26, thereby rotating the rod 22.

In Fig. 9 I have shown how the gears 20 and 21 may be dispensed with and motion transmitted from the crank 15 through the connecting link 25, bell crank 28 and link 29 to the rod 18, the bell crank being pivoted at 30 to some portion of the car.

In Fig. 10 I have shown a modification in which the gear wheels 20 and 21 have been dispensed with. Instead of the gear 20, shaft 16 is provided with a crank arm 31 to the end of which the connecting rod 32 is pivoted. The other end of the connecting rod 32 is pivoted to the lever 33, which moves about point 34 on the bracket 35. This bracket has an arcuate portion 36 on which the lever slides, and which is provided with a notch 37 for holding the lever in position while the signal is operative. A spring 38 joins the connecting rod to the switch 39. This spring serves to bring the lever 33 to inoperative position when it is released, and also controls the switch.

From the above it will be apparent that I have produced a signal that can be easily attached to any car and which will enable the driver to signal his intention to stop or to turn in either direction. The means by which the signal is operated is located in close proximity to the driver so that he can operate the same without inconvenience. I consider the operating means an important feature of my invention, as it is so designed that it is simple, cheap and convenient.

Having now described my invention, what I claim as new is:

In combination, an automobile body, a signal mounted thereon, a steering post, a quadrant secured to the steering post, a rod mounted for partial rotation about an axis parallel with the steering post, a handle on said rod, said handle having means for frictionally engaging the quadrant, a crank secured to said rod, a connecting rod secured to the end of said crank, a shaft mounted for partial rotation on the body, said shaft having a crank on one end and a gear on the other end, one end of the connecting rod being pivotally connected to the last-named crank, whereby a movement of the handle will cause the gear to rotate, a shaft extending through the body member in a direction substantially at right angles to the shaft carrying the gear, a gear on said shaft, said gear being in mesh with the first-mentioned gear, a crank on the other end of the last-mentioned shaft, and a connecting rod connecting the last-mentioned crank to the signal.

In testimony whereof I affix my signature.

ANTHONY COVIELLO.